United States Patent
Shropshire

(10) Patent No.: US 10,469,012 B2
(45) Date of Patent: Nov. 5, 2019

(54) POWER SYSTEM

(71) Applicant: Keith L Shropshire, Charlotte, NC (US)

(72) Inventor: Keith Leonardo Shropshire, Charlotte, NC (US)

( * ) Notice: Subject to any disclaimer, the term of this patent is extended or adjusted under 35 U.S.C. 154(b) by 117 days.

(21) Appl. No.: 15/463,084

(22) Filed: Mar. 20, 2017

(65) Prior Publication Data
US 2018/0269696 A1 Sep. 20, 2018

(51) Int. Cl.
| | |
|---|---|
| *H02P 9/14* | (2006.01) |
| *H02M 7/44* | (2006.01) |
| *H02P 27/06* | (2006.01) |
| *H02P 27/14* | (2006.01) |
| *H02J 7/00* | (2006.01) |
| *H02J 7/32* | (2006.01) |
| *H02K 53/00* | (2006.01) |
| *H02J 7/35* | (2006.01) |

(52) U.S. Cl.
CPC .............. *H02P 9/14* (2013.01); *H02J 7/0068* (2013.01); *H02J 7/324* (2013.01); *H02K 53/00* (2013.01); *H02M 7/44* (2013.01); *H02P 27/06* (2013.01); *H02P 27/14* (2013.01); *H02J 7/35* (2013.01); *H02P 2201/07* (2013.01); *H02P 2201/09* (2013.01); *Y02T 10/7005* (2013.01)

(58) Field of Classification Search
CPC . H02J 7/0024; H02J 7/16; H02P 27/14; H02P 9/14; H02P 27/06; H02P 2201/09; H02P 2201/07; H02M 7/44; H02N 11/008
See application file for complete search history.

(56) References Cited

U.S. PATENT DOCUMENTS

| | | | | |
|---|---|---|---|---|
| 7,511,451 B2* | 3/2009 | Pierce | ..................... | H01M 2/10 312/351.11 |
| 7,692,404 B2* | 4/2010 | Harris | ....................... | B60L 7/14 307/37 |
| 8,627,914 B2* | 1/2014 | Berbari | ................... | B60L 11/16 180/165 |
| 8,994,336 B2* | 3/2015 | Brotto | ................... | H02J 7/0065 320/136 |
| 9,059,603 B2* | 6/2015 | Douglas | .................. | H02J 3/383 |
| 9,505,307 B2* | 11/2016 | Champagne | .............. | B60L 1/02 |
| 10,128,674 B2* | 11/2018 | Nelson | .................. | H02J 7/0068 |
| 2015/0244245 A1* | 8/2015 | Uys | ........................ | H02J 7/0068 307/20 |
| 2017/0141671 A1* | 5/2017 | Stubbings | .............. | H02K 53/00 |
| 2018/0167002 A1* | 6/2018 | Frampton | ............... | H02J 7/022 |
| 2018/0326813 A1* | 11/2018 | Ganiere | ............ | B60H 1/00428 |

* cited by examiner

*Primary Examiner* — Michael C Zarroli

(57) ABSTRACT

The power source is a battery bank that is connected to a DC to AC power inverter. The DC to AC power inverter power is in wired connection with an electric motor. The rotor of the electric motor is connected to the rotor of an alternator with an alternator belt. The alternator is connected to the power source, which recharges the power source. The battery bank is then connected to a second DC to AC power inverter. The output of the power inverter is connected to a transformer for filtering and wave shaping. The transformer is connected to an electric power grid.

8 Claims, 5 Drawing Sheets

1A. POWERMAXX

1.BATTERY MASTER

FIG. 4  1A. PARTIAL SHROPSHIRE-KLX-30

POWER SYSTEM

BACKGROUND OF THE INVENTION

Since the miracle of electricity was first discovered in the 1700's the field of electricity has advanced into electrical engineering that has given the world unlimited abilities in technology, but it has also left a wave of destruction and environmental disaster.

The invention by Cuneus and Muschenbrock in 1745 that paved the way of the capacitor, later improved by Michael Faraday in 1831 the invention of the battery by Alessandro Volta in the 1700's, the invention by Benjamin Franklin in 1857 that gave us the concept of positive and negative charge in electricity, and that electrical charge were either positive or negative, and the transformer by Michael Faraday in 1831, the invention of the electric generator by Sir Charles Wheatstone in 1850 all laid the foundation for the world of electricity as we know it today. But it was not complete. It needed nuclear power, coal, or gas to produce electricity which has left the world in an environmental disaster.

In 1948, William Bradford Shockley, Jon Bardeen, and Walter Houser Brattain invented the semi-conductor which allowed electrical components to use 95% less electrical energy to operate. Nikola Tesla's invention of alternation current in 1886 allowed him to use 120 volts of alternating current to produce millions of volts using several step-up transformer. Mr. Tesla's alternating current could not produce electricity without the Electromotive force (EMF) from a power plant of some sort.

The electricity grid we use today cannot operate without nuclear power, coal, or gas. The electricity grid is not without serious problems that is dangerous to the American people.

Nuclear power is dangerous. The danger of nuclear power is that an earthquake will erupt directly underneath the plant that will cause a breach in the reactors that will cause a meltdown. The Meltdown will cause the land to become uninhabitable. It would also pose a serious threat to human life. Nuclear power is a sitting bomb.

On Apr. 26, 1986, an explosion ripped through Unit 4 of the Chernobyl Nuclear Power plant near Kiev in Ukraine, causing the worst environmental disaster in history. The explosion at Chernobyl contaminated half the planet with fallout at Chernobyl contaminated half the planet with fallout radioisotopes strontium-90, cesium-137, and plutonium-239. These radioisotopes causes cancer and they persist in the soil, the water, and the plants and animals for 1000's of years.

Coal power plants that burn coal to produce electricity is dangerous to the environment as well. There are about 80 coal ash sites in the United States known to have contaminated the grounds. The Environmental Protection Agency said about of them were high hazardous sites that poses a threat to human life.

Oil is also dangerous to our environment and oceans ecosystems. We are in desperate need for oil, therefore we drill in the ocean to help meet our demands. We need the oil because it is the only energy source that can power out automobiles, our homes, or our industries.

The prior inventions that need the coal, gas, or nuclear power plants to operate cannot produce electricity to power our automobiles, home, and our Industries without destroying our environment. We have come a long way in the development of electricity, and electrical components, especially the semi-conductor. But the prior inventions, even though desperately needed do not produce a process of self-reliance Electrical current is a natural accruing phenomenon by such occurrences as lighting. Man has been able to harness this electrical energy by machines and other mechanisms. For man to produce an electric current, some type of nonelectric energy must be converted into an electromotive force (EMF). A generator change mechanical energy into electric energy. In a generator mechanical energy spins coils of wire near a magnet to produce electric current.

An electric generator has a stationary part called a stator, and a rotating part called a rotor. In the large electric generators it used in a power plant, the stator consist of hundreds of winding of copper wire. The rotor is a large electromagnet that receives electrical power from a small separate generator called an exciter.

Another source of mechanical energy called a turbine powered mostly by steam, turns the rotor. The Magnetic fields is created by the rotors as the rotor turns. As this magnetic field rotates, it produces a voltage in the wire winding of the stator that causes a flow of electric current through the wire.

Magnetism produce an electric current by electromagnetic induction. In the process a coil of copper wire moves near a magnet. This action causes an electric current to flow through the wire. The current flow through the wire as long as the movement continues. About 90% of our power plants uses this process to produce electricity.

We have now began to move to a safer and a more Eco-friendly power source with the new technology that has been developed. The semi-conductors was invented in the late 1940 and early 1950's since then there has been an electrical device called the inverter that converts electrical power. The inverter is a device that converts (DC) direct current to (AC) alternating current. The inverter cannot produce true electrical power. It has to be wave shaped through transformer or other electrical devices.

The related art that uses the inverter do not produce true electrical current. These processes do not produce a process of self-reliance. We need a substantial amount of electrical power to power our cities and our industries. We need million s\of watts to power our world. The prior art that uses the invert in new art or inventions cannot meet our world's demands for electrical power.

The Devoltz Power systems can produce millions of watts to meet the world's demands. Now we have self-sustainable electrical energy to power our cities, our homes, and our Industries. The BatteryMaster is designed to power our automobiles and other smaller devices that need electrical energy.

SUMMARY OF THE INVENTION

Since the sem-conductor was invented in the 1950's there has been a process that I call the "Power Loop". (I also call it the Kei), This process has went unnoticed by electricians, engineers and scientist around the world. The process is an electric generator that power itself creating a continuance flow of electrical current for years without and power source outside its power loop.

The invention works by magnetic induction to move electrons through the wire to produce working energy. The power source is a battery bank, which is then converted from direct current to alternation current. This process can be built at any size. From a small as a ½ inch to as large as 500 feet or larger. This process is also designed to work as a power plant to power large cities.

This invention will inevitability become the power of the future. It will revolutionize the electrical power industries. Eliminating the damages that today's power plants are causing to our environment. It will in the future allow us to throw down all the power poles and power lines across the globe. This invention will give us unlimited electrical power anywhere on earth or space.

DESCRIPTION OF THE DRAWINGS

FIG. 1

FIG. 1 10 DC power source, 8-12 volts battery bank. 12 positive terminal of battery bank's side terminal. 13 positive wire from battery bank to DC to AC power inverter. 14 Negative wire from battery bank grounded to metal frame. 15 Class J fuse. 16 circuit breaker.

20 DC to AC power inverter. 21 DC to AC power inverters in-put. From power source 22 DC to AC power inverters out-put 23 DC to AC power inverters negative wire grounded to metal frame 24 DC to AC power inverters voltage out-put, to power electric motor. 25 Class J fuse.

30 230 volt electric AC motor. 32 Electric motor grounded to metal frame. 33 Electric motors rotor. 34 Alternator belt connecting electric motors rotor to alternators rotor. 40 200 amp 12-volt alternator, 41 alternators rotor. 42 Alternator grounded to metal frame, 43 Alternator wire to 12 volt voltage regulator. 44 Voltage regulator 45 voltage regulator wire to 10 DC power source, 8-12 volt battery bank.

FIG. 2

Figure 2:
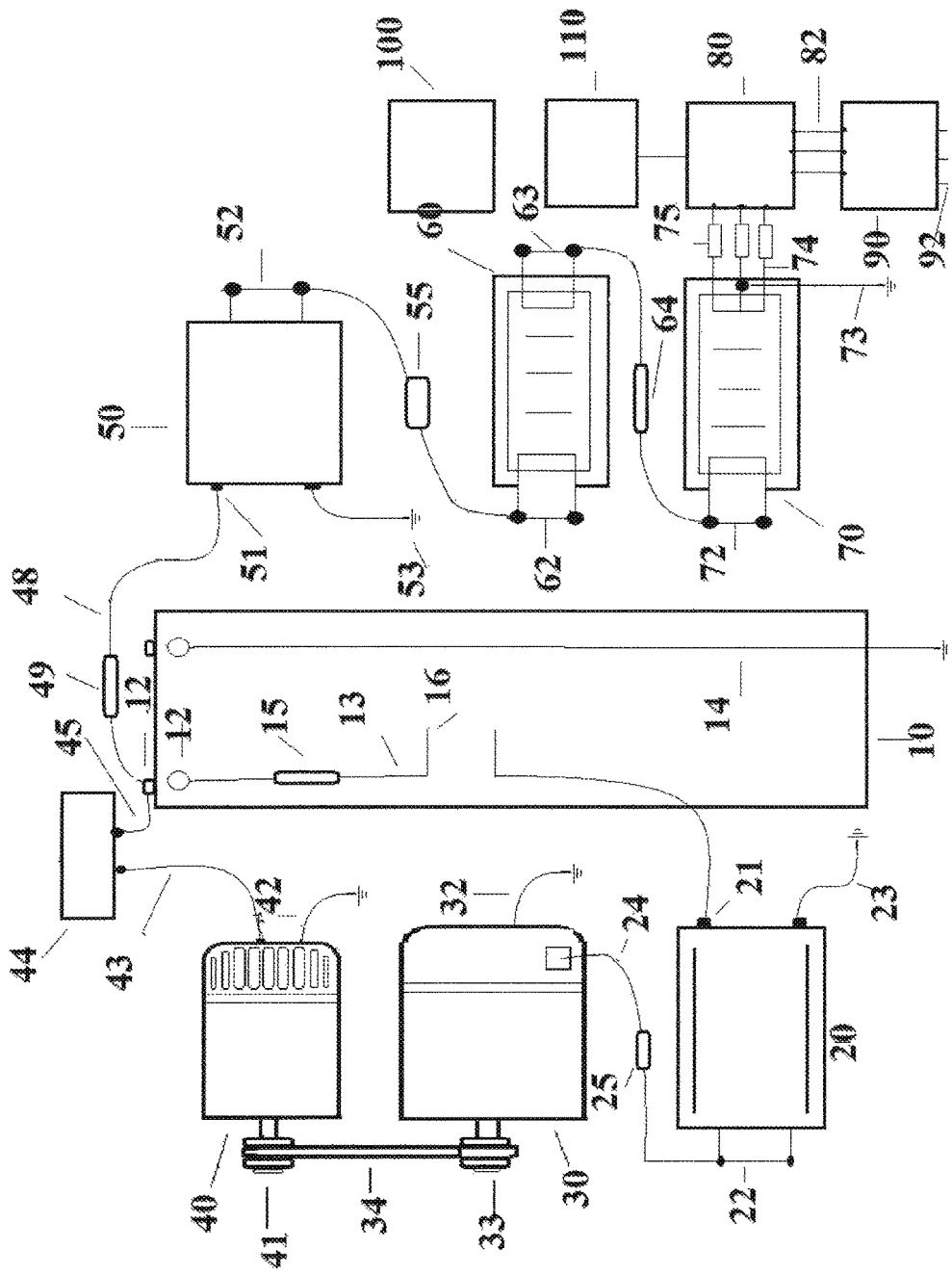
FIG. 2 is a partial view of an embodiment of the disclosure.

FIG. 2 10 DC power source, 8-12 volts battery bank. 12 positive terminal of battery terminal. 13 positive wire from battery bank to DC to AC power inverter. 14 Negative wire from battery bank grounded to metal frame. 15 Class J fuse. 16 wires to circuit breaker, 110.

20 DC to AC 1000 watt power inverter. 21 DC to AC Power inverters input from power source. 22 DC to AC power inverter output. 23 DC to AC power inverters negative wire grounded to metal frame. 24 DC to AC power inverter's 230 volt output to power electric motor. 25 Class J fuse.

230 volt electric motor. 34 Alternator belt connecting electric motor's rotor to alternator's rotor 40 200 amp, 48 volt alternator 41 alternators rotor 42 Alternator grounded to metal frame 43 alternator wire to 48 volt voltage regulator 44 Voltage regulator. 45 voltage regulator wire to 10 DC power source, 8-12 voltage bank.

12 positive terminal of the power source 8-12 volt battery bank. 48 positive wire from 10 8-12 volt battery bank to $2^{nd}$ DC to AC power inverter. 49 Class T fuse 50 $2^{nd}$ DC to AC power inverter at 24,000 watts. 51 $2^{nd}$ DC to AC power inverter input 52 $2^{nd}$ DC to AC output at 120 volts 55 Class T fuse.

60 Single phase general purpose transformer. 62 transformer primary at 120 volts. 63 Transformer's secondary 120/240 single phase. 64 Class T fuse. 70 $2^{nd}$ transformer for industrial use 72 $2^{nd}$ transformers primary 73 $2^{nd}$ transformer center tap grounded. 74 $2^{nd}$ Transformer secondary primary 75 Class T fuses 80 3PDT transfer switch 82 L1, N, L2 from 3PDT transfer switch to capacitor. 90 Capacitor, 92 L1, N, L2 wires to resident, 100 Central processing Unit-Micro controller 110 system's circuit breaker

FIG. 3

Figure 3:
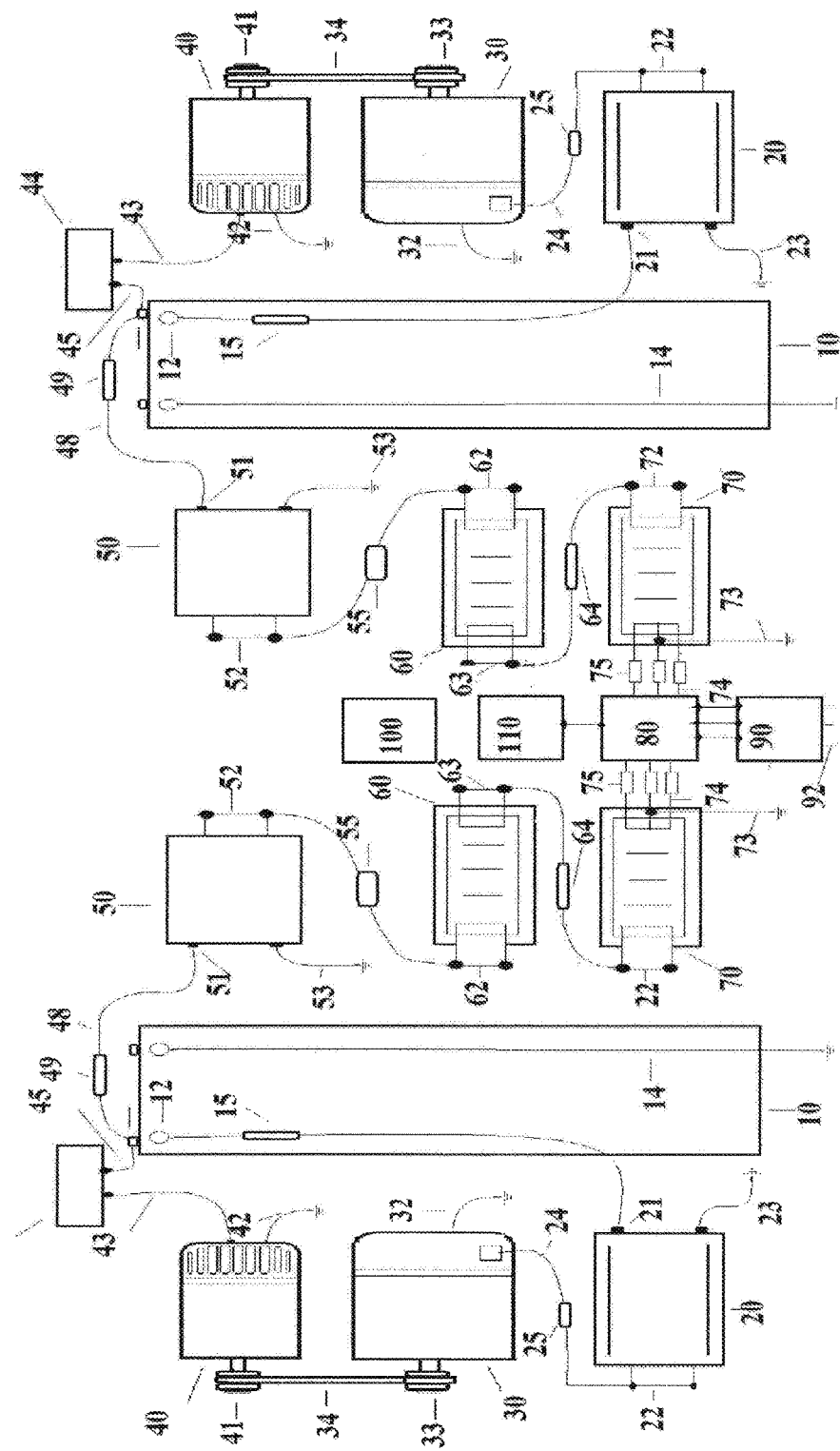
FIG. 3 is a perspective view of the embodiment of the disclosure.

FIG. 3 10 DC power source, 8-12 volt battery bank 20 DC to AC power inverter 30 Electric motor 40 Alternator 50 $2^{nd}$ DC to AC power inverter. 60 Transformer 70 Transformer 80 3PDT transfer switch 90 static capacitor 100 Central Processing unit-micro controller 110 circuit breaker.

FIG. 4

Figure 4:
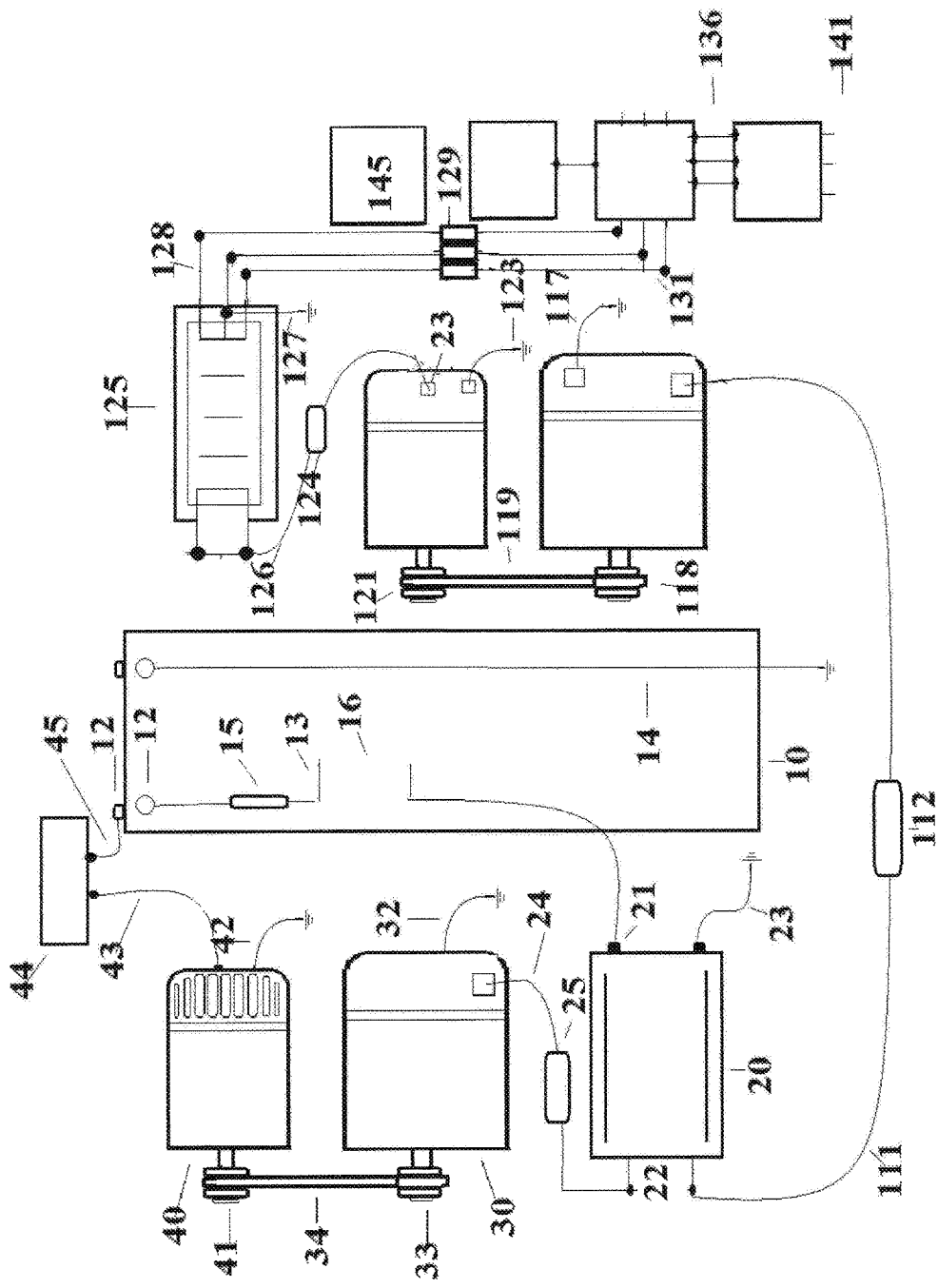
FIG. 4 is a partial view of an embodiment of the disclosure.

FIG. 4 10 DC power source, 8-12 volt battery bank 12 positive terminal of battery bank. 13 Positive wire from battery bank to DC to AC power inverter. Negative wire from battery bank grounded to metal frame. 15 Class J fuse 16 wires to circuit breaker 130. 20 DC to AC power inverter. 21 DC to AC power inverter's input from DC power source, 22 DC to AC power inverter's output 23 DC to AC power inverter's negative wire grounded to metal frame. 24 DC to AC power inverters output to power electric motor 25 Class J fuse.

30 Electric AC motor. 32 Electric motor grounded to metal frame. 33 electric motors rotor 34 Alternator belt connecting electric motor's rotor to alternator's rotor 40 Alternators 41 Alternator's rotor 42 Alternator grounded to metal frame. 43. Alternators wire to voltage regulator. 44 Voltage regulator. 45 Voltage regulator is wire to 10 DC power source, 8-12 volt battery bank.

111-20's output wire to $2^{nd}$ electric motor or exciter. 112 Class T fuse 115 Electric motor or exciter. 117 Electric motor grounded 118 Electric motor's rotor. 119 Pulley 120 Electric generator. 121 Electric generator's rotor (if not excited), 122 Electric generator grounded 123 Electric generator's wire to transformers primary 124 Class T fuses 125 Transformer 126 Transformer primary 127 Transformer grounded 128 Transformer's Secondary 129 Class T fuse 130 Circuit breaker 131 Transformers secondary wires connected to transfer switch. 135 Transfer switch 136 Power lines from transfer switch 140 Capacitor. 141 Power lines from capacitor to resident or industry 145 Central processing Unit Micro controller.

FIG. 5

Figure 5:
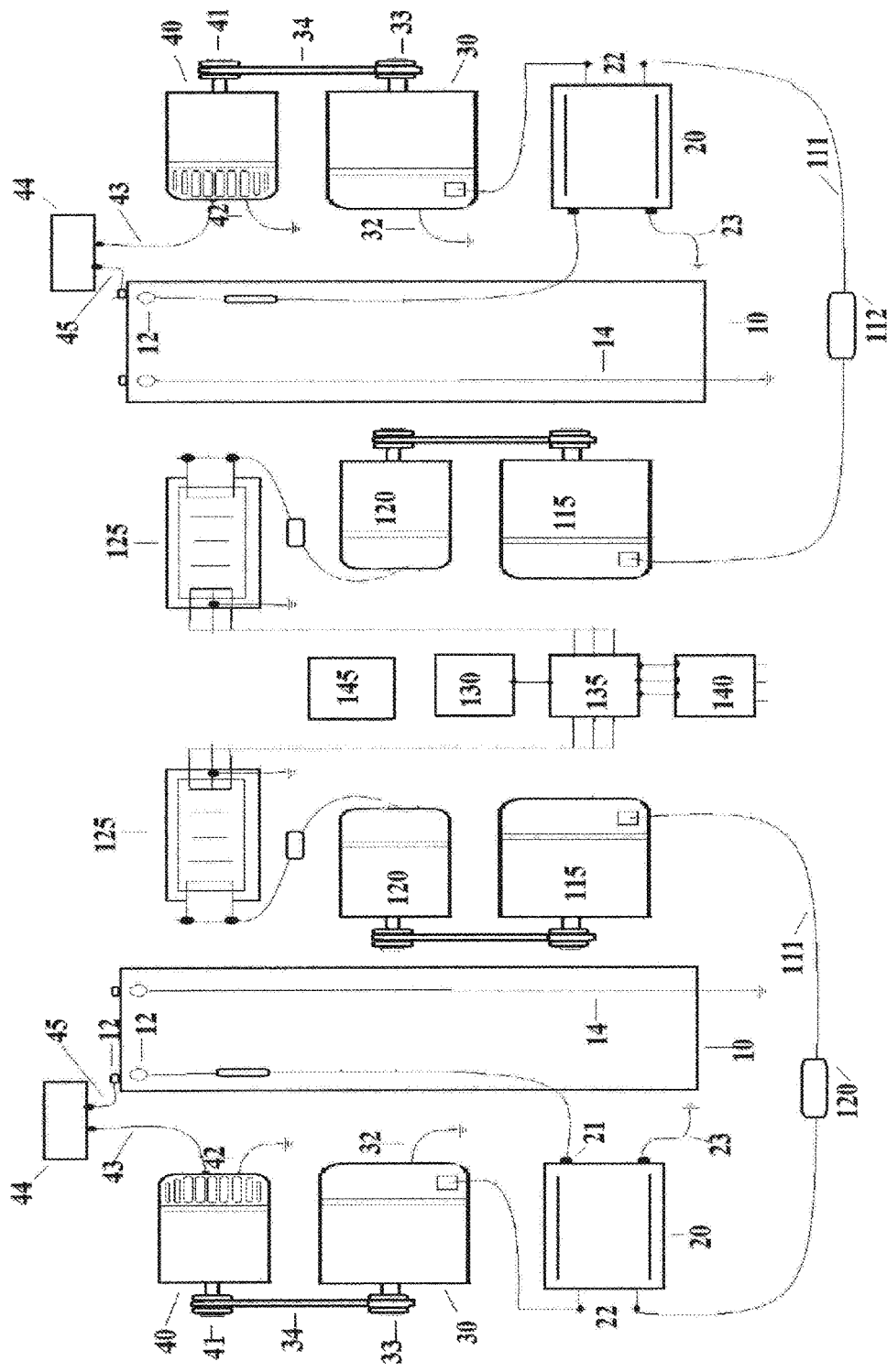
FIG. 5 is a perceptive view of the embodiment of the invention titled Devoltz Shropshire-KLX in its full perspective.

FIG. 5 10 DC power source battery bank. 20 DC to AC power inverter 30 Electric motor 40 Alternator 115 $2^{nd}$ electric motor Electric generator 125 Transformer. 130 circuit breaker 135 Transfer switch 140 Capacitor 145 CPU, or micro-controller.

DESCRIPTION OF THE INVENTION

Figure 1:
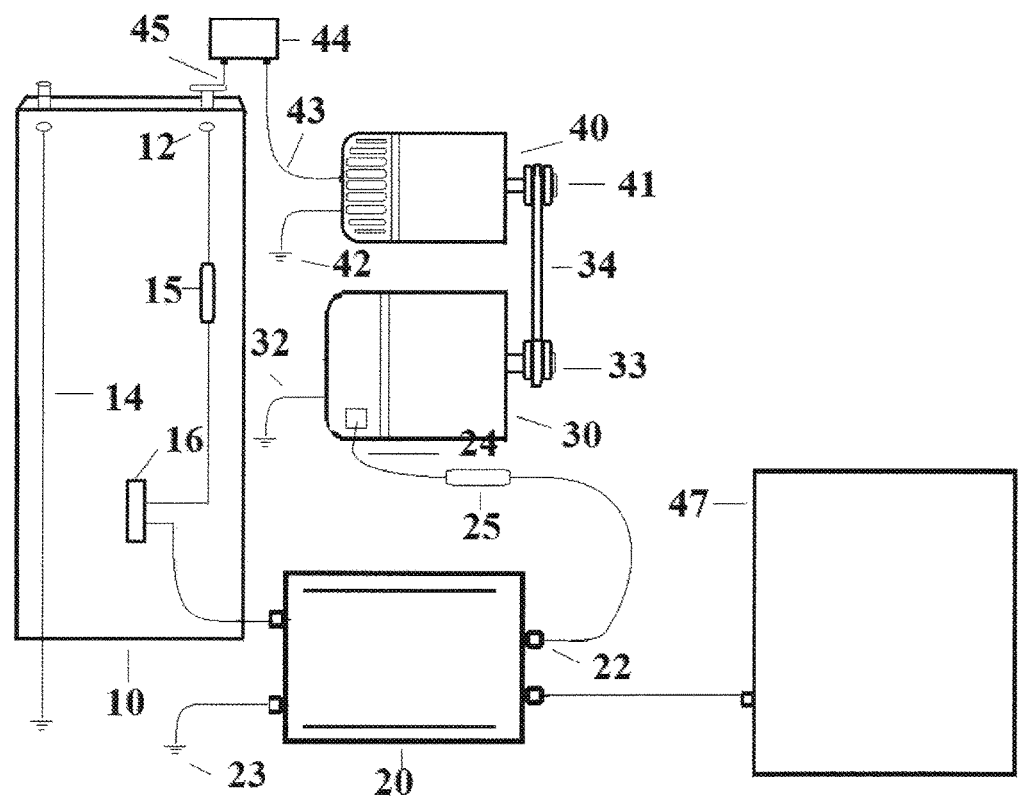
FIG. 1 is a perceptive view of the invention titled Devoltz BatteryMaster arrangement illustrating the connection of the BatteryMaster system.

The invention has a power loop that consist of 10 Battery bank, 20 DC to AC power inverter, 30 Electric motor, 40 alternator 44 voltage regulator, and then back to 10 Battery bank. FIG. 1

FIG. 1 The invention starts with 10 battery bank. The battery bank's positive terminal connector wire is connected to a circuit breaker at 48 volts. From the circuit breaker the positive wire is connected to the positive terminal of 20 DC to AC power inverter at 48 volts. The negative terminal of the battery bank is grounded to the metal frame.

The DC to AC power inverter's out-put is used to power 30 electric motor. The negative wire of the power inverter is grounded to the metal frame. The alternating current from 20 power inverter creates a magnetic field in the motor's rotor. This magnetic field from the rotor interacts with the magnetic field from the stator causing the rotor to turn.

The rotor of a small generator called an alternator, 40 is turned by the electric motor's rotor, using a alternator belt. The alternator, 40 produces electric energy that recharges the battery bank, 10. A voltage regulator 44 is used to insure the battery bank remains charged to a safe level. These 5 steps is the power-loop. The 5 steps here is also called the kei, because these steps are the key to self-sustainable electrical power in the future.

There are 2 different systems that derive from the 5 steps, the (Devoltz battery master system). 1. The Devoltz Power System FIG. 2 and FIG. 3. 2. The Devoltz Shropshire KLX systems, FIG. 4 and FIG. 5.

FIG. 2 The Devoltz Power system: Once you have established the 5 steps, the Devoltz battery master system, a $2^{nd}$ DC to AC power inverter 50 in FIG. 2, is connected to the positive terminal of the battery bank 10.

The $2^{nd}$ DC to AC power inverter, at 24000 watts, 50 has a 48 volt in-pit and a 120 volt out-put at 200 amps. The 3nd inverter's 120 volt out-put is connected to the primary of a single phase 25 KVA transformer. 60 The 120 volts from the $2^{nd}$ power inverter 50, creates a magnetic flux in the transformer core. As the current flows through the coil, it causes a changing magnetic field in the core of the transformer. When the changing magnetic field passes through the secondary winding of the transformer, it produces alternating voltage in the coil. The secondary winding is connected to the circuit in the home. The out-put voltage from the transformer's secondary winding causes alternating current to flow through the circuit. The transformer is used to filter and wave shape the converted DC to AC current from the inverter to true electrical current.

The transformer's secondary winding L1, N, and L2 is connected to a circuit breaker. The circuit breakers wire L1, N, and L2 is connected to the control panel in the home. The transformer's 60 secondary winding is first connected to a 3PDT transfer switch and then to the circuit breaker, and to the control panel inside the home.

FIG. 3, The Devoltz Power system is a twin system with 2 identical systems in one unit. A system North, and a system South. The 2 systems are controlled by a (CPU) micro-controller. The micro controller controls the 3PDT transfer switch. The 3PDT transfer switch is connected to the transformers secondary winding from system north and system south.

The Central Processing Unit (micro-controller) is programmed to switch the power source from system north to system south every 24 hours, or weekly, every 168 hours, by the transfer switch. The switching from one system to the other every so often allows each system rest, as well as serve as a back-up system in the event one system loses power.

FIG. 4 the Devoltz Shropshire KLX system: The Devoltz Batter master system FIG. 1 is the power block of the Devoltz Shropshire KLX systems. The 5 steps 10 Battery bank, 20 power inverter, 30 electric motor, 40 alternator, and back to power source 10 is the Devoltz Battery Master system. Once you have established these 5 steps in the Battery Master system, a $2^{nd}$ electric motor (or an exciter) is connected to the power inverter 20.

Alternating current from the power inverter 20 creates a magnetic field in the electric motor's or the exciter's rotor 115 FIG. 4. The magnetic field from the rotor interacts with the magnetic field from the stator causing rotor to turn. The rotor of a 3 phase AC generator 120, is turned by the electric motor or exciter, 60.

When the 3 phase AC generator's 70 rotor is turned by the electric motor's rotor or exciter 60, it produces electric current. The AC generator has a stationary part called a stator, and a rotating part called a rotor. In the generator's mechanical energy spins coils of copper wire near a magnet to produce electric current. Magnetism produce an electric current by electromagnetic induction. This action will cause an electric current to flow through the wire. The current will flow through the wire as long as the movement.

The current from the 3 phase AC generator wires, L, 1N, L2 is connected to a circuit breaker. From the circuit breaker L1, N, L2 is connected to the control panel in the home. The current from the 3 phase AC generator wire L1, N, L2 is first connected to a 3 PDT transfer switch and then to the circuit breaker, and then to the control panel in the home.

FIG. 5. The Devoltz Shropshire KLX system is ta twin system with 2 identical systems in one unit. A system North, and a system South. The 2 systems are controlled by a micro-controller, (CPU). The micro-controller controls the 3 PDT transfer switch. The 3 PDT transfer switch is connected to the 3 phase AC generator's out-put wires, from the 2 identical systems, system North and system South. The micro-controller is programmed to cause the 3 PDT transfer switch to switch power from system North to system South every 24 hours, or weekly every 168 hours.

These systems: FIG. 1. Devoltz Battery Master, FIG. 3 Devoltz Power system, and FIG. 5, Devoltz Shropshire KLX system produces a continuance flow of electric current which can be modified to desired frequency and currency.

The claim invention is:

1. An 8-12 volt battery bank, 4 batteries in series for 48 volts, and 4 batteries in parallel for a power source;
    wherein the 4 batteries are connected to a first DC to AC inverter, 48 volt in-put, 120 volt out-put, which gives the inverter alternating electrical power for as long as the 8-12 volt battery bank has power;
    wherein the 120 volt alternating electrical power from the first DC to AC inverter is in electrical connection with an electric motor.

2. The 8-12 volt battery bank according to claim 1 wherein an alternating current from the inverter powers the electric motor in order to rotate a rotor of said electric motor; wherein the rotor of the electric motor is connected to an alternator belt of an alternator, which turns an alternator rotor, which give the alternator electrical power.

3. The 8-12 volt battery bank according to claim 2 wherein the rotor of the electric motor is connected to the alternator rotor; wherein electrical power from the alternator is rectified into DC current to power the 8-12 volt battery bank.

4. The 8-12 volt battery bank according to claim 3 wherein the 8-12 volt battery bank is in electrical connection with a second inverter at 48 volt in-put and 120 volt output, a 24,000 watts.

5. The 8-12 volt battery bank according to claim 4 wherein the 8-12 volt battery bank provides electrical power to a second DC to AC inverter; wherein an output of the second inverter is connected to a primary of transformers.

6. The 8-12 volt battery bank according to claim 5 wherein the output of the first DC to AC power inverter as well as the output of the second DC to AC power inverter are in wired connection a pair of transformers in a twin system with two identical systems in one unit that switches power to a load back and forth, which is operated by a central processing unit or micro-controller.

7. The 8-12 volt battery bank according to claim 6 wherein the pair of transformers are connected to a 3 PDT transfer switch; wherein the 3 PDT transfer switch is connected to a capacitor; wherein the capacitor is connected to a circuit.

8. The 8-12 volt battery bank according to claim 7 wherein the alternator is connected to the battery bank that allows the battery bank to remain at full capacity, which allows the DC to AC power inverter to continue to power the 2 electric motors; wherein the second electric motor is an exciter; wherein the exciter is used to power a large 1,000,000 megawatt generator; wherein the 1,000,000 megawatt generator is connected to the pair of transformers.

\* \* \* \* \*